United States Patent [19]

Kovacs et al.

[11] 4,315,915
[45] Feb. 16, 1982

[54] PROCESS FOR THE PREPARATION OF STABLE COPPER (II) SULFATE MONOHYDRATE APPLICABLE AS TRACE ELEMENT ADDITIVE IN ANIMAL FODDERS

[75] Inventors: Ferenc Kovács, Varpalota; Ákos Andor; Tivadar Palágyi, both of Budapest, all of Hungary

[73] Assignee: Dolokémia Vegyipari Szövetkezet Közös Vállalat, Várpalota, Hungary

[21] Appl. No.: 159,380

[22] Filed: Jun. 13, 1980

[51] Int. Cl.$^3$ ............... A01N 59/20; A61K 33/34; C01G 3/10
[52] U.S. Cl. .................... 424/143; 423/557; 423/267
[58] Field of Search ............ 423/557, 267, 23; 424/143

[56] References Cited

U.S. PATENT DOCUMENTS

| | | | |
|---|---|---|---|
| 2,800,424 | 7/1957 | Marshall | 424/143 |
| 3,025,136 | 3/1962 | Hirao et al. | 423/557 |
| 3,404,951 | 10/1968 | Tanabe et al. | 423/557 |
| 3,597,154 | 8/1971 | Weber et al. | 423/557 |
| 3,661,517 | 5/1972 | Bordeaux | 423/557 |
| 3,846,545 | 11/1974 | Hess et al. | 424/143 |

FOREIGN PATENT DOCUMENTS 130709 8/1919 United Kingdom ............ 424/143

OTHER PUBLICATIONS

Kirk-Othmer, Encyclopedia of Chemical Technology, 2nd Edition, vol. 6, pp. 276-278, (1965).

Primary Examiner—Gary P. Straub
Attorney, Agent, or Firm—Gabriel P. Katona

[57] ABSTRACT

The invention relates to an improved process for the production of practically non-hygroscopic, easily grindable copper(II) sulfate monohydrate which is stable even in finely ground state and can be applied as trace element additive in animal fodders, by neutralizing the free sulfuric acid content of copper(II) sulfate pentahydrate with sodium, potassium or ammonium hydroxide, carbonate or hydrocarbonate (further on: alkaline agent) and removing four moles of its crystal water content by drying at 80° to 150° C. for at least 30 minutes. The improvement according to the invention consists in that copper(II) sulfate pentahydrate, melted in its own crystal water, is treated with 3 to 20% by weight, preferably 5 to 8% by weight, of an alkaline agent calculated as sodium carbonate for the weight of the copper(II) sulfate pentahydrate, over the stoichiometric amount required to neutralize the free sulfuric acid content.

By the method of the invention stabilized copper(II) sulfate monohydrate can be prepared on industrial scale directly from copper(II) sulfate pentahydrate, a cheap starting substance. The process can be performed very easily and economically.

2 Claims, No Drawings

PROCESS FOR THE PREPARATION OF STABLE COPPER (II) SULFATE MONOHYDRATE APPLICABLE AS TRACE ELEMENT ADDITIVE IN ANIMAL FODDERS

The invention relates to an improved process for the preparation of practically non-hygroscopic, easily grindable copper(II) sulfate monohydrate, stable even in finely ground state, which can be applied as trace element additive in animal fodders.

As known, microelements play an increasingly important role in modern animal husbandry and foddering, since beside the fodders utilized as energy sources microelements are also required for the proper function of animal cells and tissues.

A microelement of vital importance is, among others, copper, which participates primarily in the haemoglobin production of the animal organism, but also plays an important role in the action of certain enzymes (such as uricase, cytochromeoxidase and polyphenyloxidase), the development of the bone and nerve tissues, colouration of hair and wool, furthermore in the protection of the great vessel walls.

The copper demand of the animals depends on numerous factors, such as the purpose of husbandry, the breed, age, general health conditions and genetic endowments of the animal, furthermore on the protein and energy content of the fodder. The various compounds of copper are utilized by the animal organism with different efficiency; in this respect copper sulfate proved to be the most favourable.

Copper sulfate is the most important copper salt from industrial aspects as well. Methods which are simple to perform even on large scale are known only for the production of copper sulfate pentahydrate, but this salt can be applied less favourably as a trace element supplement for fodders, since it contains relatively high amounts of crystal water and always contains free sulfuric acid as well. These substances may spoil certain components of the fodder, such as the unsaturated vegetable and animal oils and fats and the vitamins.

According to the methods known so far copper(II) sulfate monohydrate is prepared from saturated copper sulfate solutions or by dehydration from solid pentahydrate. The more widespread methods are as follows:

(a) According to the method described in Gmelin's Handbuch der anorganischen Chemie, Vol. 60, part B, ed. 1, 1958, p. 576, copper sulfate monohydrate can be prepared by treating a saturated copper sulfate solution with concentrated sulfuric acid or oleum. Depending on the concentration of sulfuric acid, solid copper sulfate pentahydrate, copper sulfate trihydrate, copper sulfate monohydrate and anhydrous copper sulfate can equally be obtained from the ternary system. A disadvantage of this method is that the satisfactory removal of free sulfuric acid from the resulting monohydrate requires dry methanol or ethanol, which increases the costs of production considerably.

(b) According to a further method the saturated copper sulfate solution is boiled, and the temperature of the mass, which concentrates and than solidifies, is raised gradually to 120° C. [Kirk-Othmer: Encyclopedia of Chemical Technology, Vol. I, p. 24 (1953)], whereupon the substance gradually converts into the monohydrate. The composition of the resulting solid corresponds to the stoichiometric formula of $CuSO_4.H_2O$. This method has the disadvantage that it is very difficult to remove the solid product from the evaporating apparatus. According to a more up-to-date technology this difficulty is eliminated by spray-drying the saturated copper sulfate solution with air heated to 120° C. This method yields a product of very fine distribution, but at very high productions costs.

(c) As described by Liptay [Atlas of Thermoanalytical Curves, Vol. 4, pp. 474–7 (Akadémiai Kiadó, Budapest (1954)], the partial dehydration of copper sulfate pentahydrate starts at a temperature above 90° C., and when heating the pentahydrate at 120° C. for a prolonged period or at 150° for a shorter period, four moles of crystal water leave. The fifth mole of crystal water starts to leave only at temperatures of about 200° C., and the removal is completed at 230° to 250° C. This method of drying can be performed in tray dryers, drying drums or fluidization dryers operated with hot (120° C.) air. Taking into account, however, that copper sulfate solutions always contain free sulfuric acid, a highly corrosive water/copper sulfate/sulfuric acid system is present during drying, thus the drying apparatus should be made from expensive corrosion resistant materials. A further disadvantage of this method is that it yields a hygroscopic product.

(d) Tate and Warren [Trans. Faraday Soc. 35, 1192 (1939)] utilize organic solvents, such as benzene, cyclohexanone and light petrol to convert copper sulfate pentahydrate into the monohydrate. When benzene is applied, the mixture is distilled at 80° C. for three hours, whereas when cyclohexanone is used, a distillation at 80° C. for 5 hours is required.

(e) According to Bidwell and Sterling [Ind. Eng. Chem. 17, 147 (1925)] the pentahydrate is converted into the monohydrate by distilling it with hot toluene and xylene.

It follows from the above that none of the known processes provides an economical method for the large-scale production of copper sulfate monohydrate.

The invention aims at the elimination of the disadvantages of the known methods. According to the invention copper sulfate monohydrate, applicable as trace element additive in animal fodders, is prepared by an improved and economical method which can be performed easily on industrial scale.

The invention is based on the recognition that when copper(II) sulfate pentahydrate, melted in its own crystal water, is treated with an alkaline agent in an amount exceeding the amount required to neutralize the free sulfuric acid content by at least 3% by weight, related to the copper(II) sulfate pentahydrate feed, and the resulting mixture is dried, a practically non-hygroscopic copper(II) sulfate monohydrate product is obtained, which is stable even in a finely ground state. Copper(II) sulfate monohydrate of this quality can be applied to advantage as trace element additive in animal fodders. This recognition is surprising, since in the knowledge of the state of art it was not aforeseen that a stable product will form upon increasing the amount of the alkaline agent applied to neutralize the free sulfuric acid content.

Based on the above, the invention relates to an improved process for the production of practically non-hygroscopic, easily grindable copper(II) sulfate monohydrate which is stable even in finely ground state and can be applied as trace element additive in animal fodders, by neutralizing the free sulfuric acid content of copper(II) sulfate pentahydrate with sodium, potassium or ammonium hydroxide, carbonate or hydrocarbonate (further on: alkaline agent) and removing four moles of its crystal water content by drying at 80° to 150° C. for at least 30 minutes. The improvement according to the invention consists in that copper(II) sulfate pentahydrate, melted in its own crystal water, is treated with 3 to 20% by weight, preferably 5 to 8% by weight, of an alkaline agent calculated as sodium carbonate for the weight of the copper(II) sulfate pentahydrate, over the stoichiometric amount required to neutralize the free sulfuric acid content.

According to the invention one proceeds preferably by charging copper(II) sulfate pentahydrate feed into a rotating drum dryer, and adding 5 to 7% by weight of calcined soda over the stoichiometric amount required to neutralize the free sulfuric acid content of the starting substance. After a short stirring the temperature of the salt mixture is gradually raised to 110° to 118° C., and this temperature is maintained for about 2 hours. The mixture is allowed to cool, and the resulting granular substance is ground to the required grain size in a hammer mill.

The major advantages of the process of the invention are as follows:

(a) It enables one to prepare stabilized copper(II) sulfate monohydrate on industrial scale directly from copper(II) sulfate pentahydrate, a cheap starting substance. The resulting product can be ground very easily, and it is stable even in finely ground state.

(b) The reactions and the drying proceed very quickly.

(c) The process can be performed very easily and economically on large scale.

(d) The resulting product can be utilized directly, i.e. without any subsequent conversion or purification, and very advantageously as trace element additive in animal fodders, since it is physically stable and does not agglomerate, thus it can be admixed easily with the fodder.

The process of the invention is elucidated in detail by the aid of the following non-limiting Examples.

EXAMPLE 1

950 kg of copper sulfate pentahydrate (blue copperas), containing 0.245% of free sulfuric acid, are fed into a drying apparatus equipped with a vertical rotating cylindric drum. 2.5 kg of sodium carbonate are required to neutralize the free sulfuric acid content of the starting substance. Over this amount the alkaline agent is utilized in an amount of 8% by weight related to the blue copperas, which corresponds to 76 kg of sodium carbonate. Thus a total amount of 78.5 kg of calcined soda are fed into the drying apparatus.

After 10 minutes of blending the temperature of the salt mixture is raised gradually to 110°-118° C., and this temperature is maintained for 80 minutes. The salt mixture melts within 20 to 30 minutes, and then it starts to aggregate as its water content decreases. The resulting granular substance is allowed to cool, and then ground in a hammer mill to the required grain size.

607 kg (97%) of stabilized copper sulfate monohydrate are obtained. The copper content of the product is 32–33%; free acid cannot be detected.

Example 1/A (comparative example)

One proceeds as described in Example 1 with the difference that only the free sulfuric acid content of the starting blue copperas is neutralized with 2.5 kg of calcined soda. The salt mixture does not aggregate upon drying, but it gradually disaggregates to form a fine powder. This considerably decreases the efficiency of drying, and greatly increased dust loss, causing thereby serious economical, technological and hygienic problems. The process yields a hygroscopic product, which cannot be applied to prepare fodder premixes with predetermined composition.

Dust losses can be decreased by using tray dryers, but this requires much manpower, further decreasing the economy of the process.

EXAMPLE 2

950 kg of blue copperas, containing 0,.245% of free sulfuric acid, are introduced into the drying apparatus described in Example 1. 3.3 kg of potassium carbonate are required to neutralize the free acid content. Over this amount the alkaline agent is utilized in an amount of 10% by weight related to blue copperas, which corresponds to 95 kg of sodium carbonate. Thus a total amount of 127.3 kg of potassium carbonate is added to the blue copperas.

The salt mixture is heat treated for 45 minutes at 130° to 138° C. as described in Example 1, and then it is ground to the required grain size. 731 kg (95%) of stabilized copper sulfate monohydrate are obtained. The copper content of the product is 30–31%; free acid cannot be detected.

EXAMPLE 3

950 kg of blue copperas, containing 0.65% of free sulfuric acid, are fed into the drying apparatus described in Exaple 1. 5.3 kg of sodium hydrocarbonate are required to neutralize the free acid content. Over this amount the alkaline agent is utilized in an amount of 5% by weight, which corresponds to 47.5 kg of sodium carbonate. This latter amount of sodium carbonate is equivalent to 37.6 kg of sodium hydrocarbonate. Thus a total amount of 42.9 kg of sodium hydrocarbonate are added to the blue copperas. The salt mixture is agglomerated and ground as described in Example 1 to obtain 675 kg (97%) of stabilized copper sulfate monohydrate. The copper content of the product is 33.5–34.5%; free acid cannot be detected.

EXAMPLE 4

950 kg of blue copperas, containing 0.245% of free sulfuric acid, are fed into the drying apparatus described in Example 1. 6.7 kg of a 25 w/w % aqueous ammonium hydroxide solution are required to neutralize the free acid content. Over this amount the alkaline agent is utilized in an amount of 18% by weight related to the blue copperas, which corresponds to 171 kg of sodium carbonate. This latter amount of sodium carbonate is equivalent to 452 kg of a 25 w/w % aqueous ammonium hydroxide solution. Thus a total amount of 458.7 kg of a 25 w/w % aqueous ammonium hydroxide solution is added to the blue copperas.

The salt mixture is subjected to heat treatment at 110°–118° C. for 2 hours as described in Example 1, and then ground to the desired grain size. The resulting 668 kg (96%) of stabilized copper sulfate monohydrate contains 33.5–34.5% by weight of copper and no free acid.

EXAMPLE 5

950 kg of blue copperas, containing 0.65% of free sulfuric acid, are fed into the drying apparatus described in Example 1. 12.6 kg of a 40 w/w % aqueous sodium hydroxide solution are required to neutralize the free acid content. Over this amount the alkaline agent is applied in an amount of 3.5% by weight related to the blue copperas, which corresponds to 33.3 kg of sodium carbonate. This latter amount of sodium carbonate is equivalent to 62.8 kg of a 40 w/w % aqueous sodium hydroxide solution. Thus a total amount of 75.4 kg of a 40 w/w % aqueous sodium hydroxide solution is added to the blue copperas.

The salt mixture is agglomerated and ground as described in Example 1 to obtain 679 kg (97%) of stabilized copper sulfate monohydrate. The product contains 33.5–34.5% of copper and no free acid.

EXAMPLE 6

950 kg of blue copperas, containing 1.2% of free sulfuric acid, are fed into the drying apparatus described in Example 1. 13.3 kg of ammonium carbonate monohydrate are required to neutralize the free acid content. Over this amount the alkaline agent is utilized in an amount of 7% by weight related to the blue copperas, which corresponds to 66.5 kg of sodium carbonate. This latter amount of sodium carbonate is equivalent to 72 kg of ammonium carbonate monohydrate. Thus a total amount of 85.3 kg of ammonium carbonate monohydrate is added to the blue copperas. The salt mixture is agglomerated and ground as described in Example 1 to obtain 669 kg (97%) of stabilized copper sulfate monohydrate. The product contains 32.5–33.5% of copper and no free acid.

What we claim is:

1. In a process for the production of non-hygroscopic, stable, easily grindable copper(II) sulfate monohydrate applicable as a trace element additive in animal fodders, by neutralizing the free sulfuric acid content of copper(II) sulfate pentahydrate feed with an alkaline agent selected from sodium, potassium or ammonium hydroxide, carbonate or hydrocarbonate and removing four moles of its crystal water content by drying at 80° to 150° C. for at least 30 minutes, the improvement comprising treating copper (II) sulfate pentahydrate, melted in its own crystal water, during the neutralization with 3 to 20% by weight of said alkaline agent calculated as sodium carbonate based on the weight copper(II) sulfate pentahydrate feed in addition to the stoichiometric amount of said alkaline agent required to neutralize the free sulfuric acid content of said copper-(II) sulfate pentahydrate.

2. The process as claimed in claim 1 wherein 5 to 8% of said alkaline agent is used in said treating step in addition to the stoichiometric amount required to neutralize the free sulfuric acid content.

* * * * *